Figure 1:
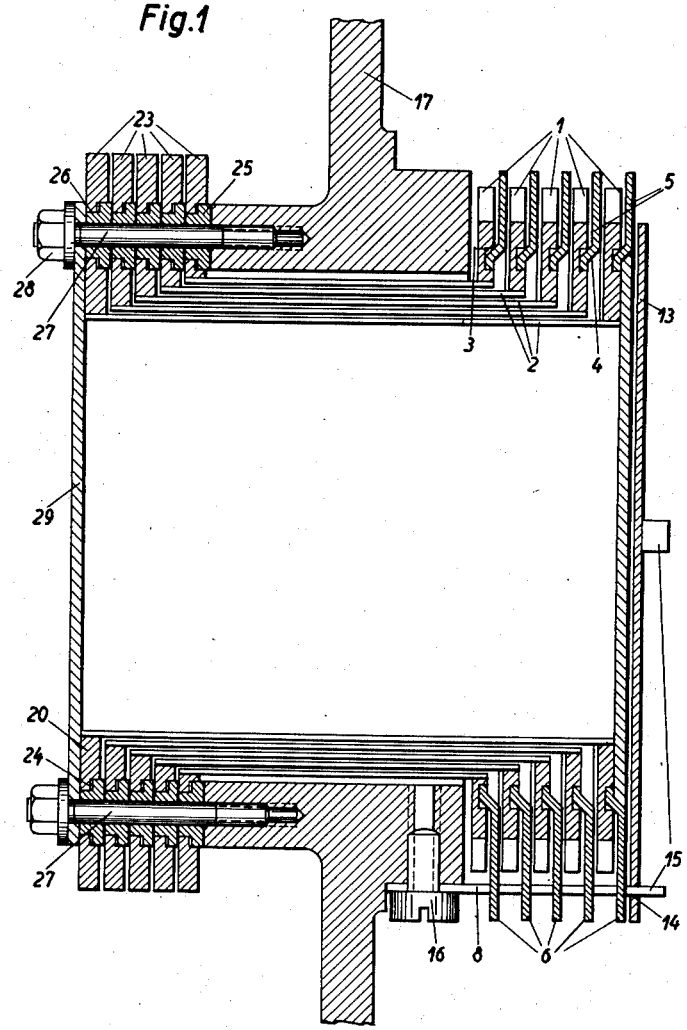

Dec. 25, 1951 K. AURBACH 2,579,535
TYPE WHEEL ADJUSTING MECHANISM
Filed Aug. 16, 1949 2 SHEETS—SHEET 2
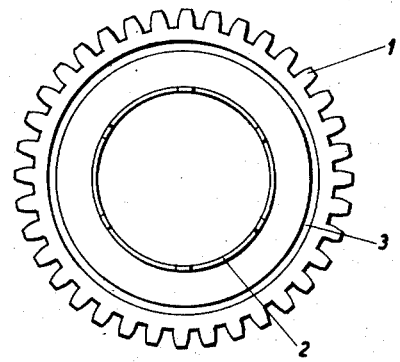
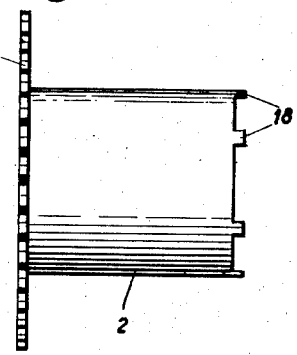
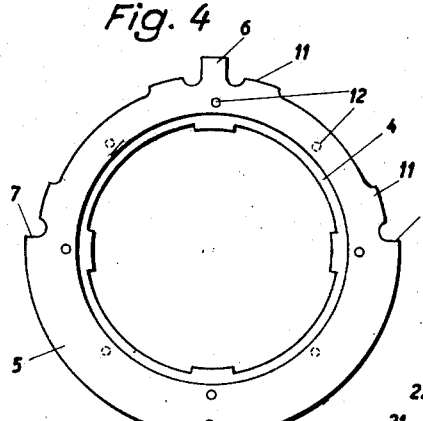
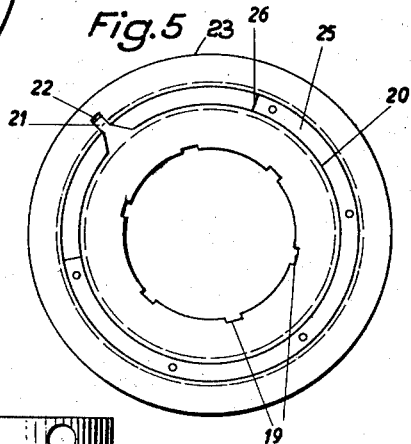
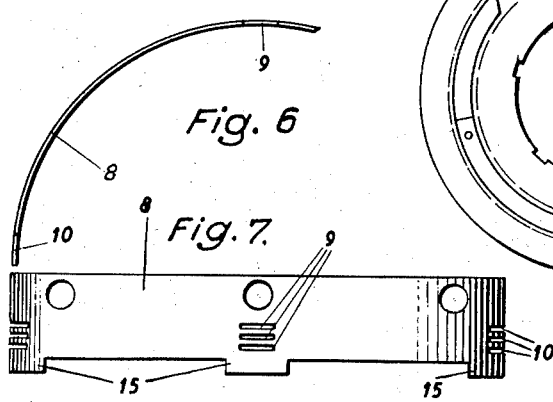
Inventor:
Kurt Aurbach.
BY Knight Bros
ATTORNEYS.

Patented Dec. 25, 1951

2,579,535

UNITED STATES PATENT OFFICE 2,579,535

TYPE WHEEL ADJUSTING MECHANISM

Kurt Aurbach, Bielefeld, Germany, assignor to Anker-Werke, A. G., Bielefeld, Germany, a corporation of Germany Application August 16, 1949, Serial No. 110,552
In Germany October 1, 1948

10 Claims. (Cl. 101—110)

The invention relates to mechanisms for the transmission of motion, especially in business machines such as cash registers, calculating machines or bookkeeping machines.

In known machines of this kind, the type wheels or the type-wheel adjusting members of a printing device are attached to hollow concentric transmission shafts to permit mounting the printing device, for instance, at one side of the machine. The hollow shafts are driven from the adjusting or actuating mechanism of the machine through spur gears or gear sectors.

The hollow shafts of such transmissions must be machined on their full length to afford a satisfactory journaling. Due to the sometimes considerable length of the hollow shafts, appreciable friction is encountered which may interfere with the desired ease of operation especially in machines whose type wheels are directly adjusted by a mechanical connection with the manual item-setting or control means as is the case in lever-type register mechanisms.

It is an object of the invention to devise a hollow-shaft transmission, especially for machines of the above-mentioned kind, that eliminates the necessity of an extensive and accurate machining of the transmission shafts and, if desired, permits using simple drawn tubes with raw peripheral surfaces without detriment to the desired accuracy of transmission.

Another object of the invention is to provide a hollow-shaft transmission which eliminates the above-mentioned detrimental friction regardless of the length or number of concentric transmission shafts.

In order to achieve these objects and in accordance with one of the features of the invention, a transmission mechanism, in particular for adjusting the type wheels of a cash register or other business machine, has a plurality of concentric transmission tubes radially spaced from one another; and each transmission unit—comprising a transmission tube and two gear or wheel members at the respective ends of the tube—is journaled in bearing means that engage the gear or wheel members rather than the tube.

According to another feature of the invention, a type wheel member is secured to one end of each tube and a spur gear member is firmly secured to the other end to impart the type selecting motion through the tube to the wheel member; and each of the wheel and gear members has a circular or arcuate guiding face concentric to the tube and engaged by stationarily mounted bearing means.

These and other objects and features of the invention will be apparent from the embodiment of the invention exemplified by the drawing and described in the following.

Figure 1 shows an axial section through a mechanism according to the invention applied to the printing device for a cash register or other business machine; and Figs. 2 to 7 show details of the same mechanism, Fig. 6 being a partial bottom view of the part shown in Fig. 7.

The illustrated printing device comprises a number of coaxial spur gears 1 (Figs. 1, 2, 3) arranged side by side at the driving end of the transmission and riveted or otherwise firmly attached to respective transmission tubes 2. The tubes 2 surround one another concentrically. They have different, graduated lengths and are radially spaced from one another.

Each spur gear 1 has a circular groove 3 concentric to the tubes 2. Each groove 3 is engaged by a corresponding circular projection formed by an indentation 4 (Figs. 1 and 4) of a bearing disc 5. Each disc 5 has projections 6, 7 with which it is mounted in a stationary holder 8 (Figs. 1, 6, 7). The projection 6 of each disc 5 engages a slot 9, and the two projections 7 engage respective slots 10 of holder 8. Additional projections 11 of each disc 5 limit its movement relative to the holder 8. Bosses 12, which project from both sides of each bearing disc 5, secure a proper lateral spacing between the spur gears 1. A cover plate 13 (Fig. 1) has openings with which it is placed under tension over projections 15 of holder 8. Holder 8 is firmly secured by screws 16 to a supporting frame 17 which is part of the frame or wall of the business machine or, preferably, is a separate structure to be fastened to the main frame or wall of the machine.

Each tube 2 has noses 18 (Fig. 3) engageable with matching grooves 19 (Fig. 5) of a ring 20 which has a radial projection or driver 21 in engagement with an opening 22 of an annular type carrier 23 (Figs. 1 and 5) and is stepped at 24 (Fig. 1). Each of a group of type carriers 23 is journaled on a guide ring 25 whose guide portion 26 extends over only part of the periphery. The remaining part of the periphery is cut out so that the driver 21 can move angularly with respect to ring 25 in order to entrain and adjust the type carrier 23. All guide rings 25 are stacked onto bolts 27 which are screwed into the support 17. A cover plate 29 fastened by nuts 28 holds the annular type carriers 23 in position.

When the illustrated mechanism is inserted in a business machine, the spur gears 1 are in meshing engagement with gears, sectors or racks which are actuated or controlled by the amount-setting device or keys (not shown) of the machine. Of course, a second system of concentric tubes may be provided to couple the spur gears 1 with the amount-setting means of the machine, for instance, to permit mounting the printing mechanism at one side of the machine. The rotary movement imparted in any of these ways to the spur gears 1 is transmitted by the respective tubes 2 to the composite type wheel units whose type carriers 23 assume rotational positions corresponding to the numerals of the amount to be listed. After the type carriers 23 are thus adjusted, one or several printing platens or hammers (not illustrated) force one or several paper slips or tapes against the type carriers in order to print the adjusted amount.

It is apparent from the above-described embodiment that the transmission tubes 2 are relieved from all journaling duty and hence do not require machining along most or all of their length. As a matter of fact, drawn tubes with non-machined surfaces are readily applicable. It will further be recognized that the bearing friction of the transmission is reduced to a minimum and substantially independent of the length of the tubes. It will also be obvious to those skilled in the art that, as regards design details, the invention permits various modifications, and may be embodied in designs other than the one specifically illustrated and described, without departing from the objects and principles of the invention and within the essential features set forth in the claims annexed hereto.

I claim:

1. A type adjusting mechanism for a printing device, comprising a plurality of rotary and coaxial type carrier members, a plurality of coaxial drive gear members axially spaced from said type carrier members, a plurality of concentric transmission tubes connecting said type carrier members with said respective gear members, and bearing means spaced from said tubes and in journaling engagement with said respective members.

2. A type adjusting mechanism for the printing device of a business machine, comprising a plurality of annular type carriers coaxial and adjacent to one another, a corresponding plurality of spur gears for individually rotating said carriers, said gears being coaxial and adjacent to one another and axially spaced from said carriers, a correspondingly plurality of concentric tubes radially spaced from one another, each of said tubes connecting one of said respective gears with one of said respective carriers, and separate bearing means in individual journaling engagement with each of said carriers and each of said gears.

3. A mechanism for transmitting rotary motion, comprising a plurality of transmission units each having a transmission tube and having a driving member and a driven member secured to said tube at the respective ends thereof, said tubes of said units being concentric and radially spaced from one another, and bearing means coaxial to said tubes and in journaling engagement with said respective members.

4. A mechanism for transmitting rotary motion, comprising a plurality of concentric transmission tubes, a group of annular drive members each attached to one end of one of said respective tubes, a group of annular driven members spaced from said group of drive members, said driven members being attached to the other ends of said respective tubes, each of said driving and driven members having respective circular and coaxial bearing faces of larger diameter than said respective tubes, and stationary bearing means spaced from said tubes and in journaling engagement with said bearing faces of said respective members.

5. In a mechanism according to claim 4, the members of one of said groups having coaxial circular grooves respectively which form said respective bearing faces, and said bearing means of said one group comprising guide discs disposed adjacent to said respective members of said one group and having a circular indentation engaging said respective grooves.

6. In a mechanism according to claim 5, in combination, a stationary holder extending across said discs and being engaged thereby to maintain a fixed axial spacing between said discs, and said discs having projections directed toward the adjacent members for maintaining a substantially fixed axial spacing between said members.

7. A type adjusting mechanism for a printing device, comprising a group of annular spur gears coaxial and adjacent to one another, bearing means disposed intermediate said gears and in journaling engagement with said individual gears, a group of concentric transmission tubes each having one end attached to one of said respective gears, a group of drive rings connected to the other ends of said respective tubes, a group of type carriers surrounding said respective rings and being radially spaced therefrom to form a circular gap therewith, bearing means extending through said gaps for journaling said rings and carriers, each of said rings having a drive means connecting said ring with the one appertaining carrier across said gap.

8. In a mechanism according to claim 7, said drive rings and said respective tubes having mutually engageable nose-and-groove means, and said drive rings being connected with said respective tubes merely by being seated thereon so that said respective nose-and-groove means are in engagement with each other.

9. A type adjusting mechanism for a printing device, comprising a supporting frame for attachment to a business machine, a plurality of annular spur gears, bearing means attached to said frame and in journaling engagement with said gears, a plurality of annular type carrier members axially spaced from said gears, bearing means attached to said frame and in journaling engagement with said members, and a plurality of concentric transmission tubes connecting said gears with said respective members and being supported only by said gears and members.

10. A type adjusting mechanism for a printing device, comprising a group of annular spur gears coaxial and adjacent to one another, said gears having the same outer diameters and progressively different inner diameters respectively and having respective bearing grooves of equal diameters, a group of guide discs disposed adjacent to said respective gears and having each a circular projection engaging said groove of an adjacent gear, a group of concentric transmission tubes of which the inner ones are longer than the outer ones, said tubes having one end connected with said respective gears, and a group of annular type carrier members having progressively different inner diameters and being connected with the other ends of said respective tubes, said members having equal outer diameters respectively and having respective arcuate slots of equal diameters, and means traversing said slots for journaling said members.

KURT AURBACH.

No references cited.